(12) United States Patent
Weitemeier et al.

(10) Patent No.: US 9,695,950 B2
(45) Date of Patent: Jul. 4, 2017

(54) PINCH VALVE

(71) Applicant: Sartorius Lab Instruments GmbH & Co. KG, Goettingen (DE)

(72) Inventors: Swen Weitemeier, Loedingsen (DE); Lars Boettcher, Melsungen (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 51 days.

(21) Appl. No.: 14/292,747

(22) Filed: May 30, 2014

(65) Prior Publication Data
US 2014/0264100 A1    Sep. 18, 2014

Related U.S. Application Data

(63) Continuation of application No. PCT/EP2012/003955, filed on Sep. 21, 2012.

(30) Foreign Application Priority Data

Nov. 30, 2011   (DE) .................. 10 2011 055 850

(51) Int. Cl.
    *F16K 7/04*   (2006.01)
    *F16K 7/06*   (2006.01)

(52) U.S. Cl.
    CPC ............. *F16K 7/045* (2013.01); *F16K 7/06* (2013.01); *F16K 7/061* (2013.01)

(58) Field of Classification Search
    CPC . F16K 7/06; F16K 7/061; F16K 7/063; F16K 7/065; F16K 7/04; F16K 7/045
    (Continued)

(56) References Cited

U.S. PATENT DOCUMENTS 2,958,502 A * 11/1960 Grigsby .................. F16K 7/061
                                                        251/8
3,759,483 A *  9/1973 Baxter ...................... F16K 7/06
                                                        251/251
(Continued)

FOREIGN PATENT DOCUMENTS

DE    EP 0637707 A1 *  2/1995  ............. F16K 7/063
DE       19917622 A1    11/2000
(Continued)

OTHER PUBLICATIONS

International Search Report of the corresponding PCT application No. PCT/EP2012/003955, mailed Nov. 28, 2012.

*Primary Examiner* — Kevin Murphy
*Assistant Examiner* — Jonathan Waddy
(74) *Attorney, Agent, or Firm* — Edell, Shapiro & Finnan, LLC

(57) ABSTRACT

A pinch valve includes a clamping jaw (12) which displaces perpendicularly to an axial direction and forms a mouth (16) that receives a flexible tube (18) that extends in the axial direction, and an abutment (12; 21) which is opposite the clamping jaw in the jaw displacement direction. The clamping jaw and the abutment are disposed relative to one another such that the tube is pinched by the advancing clamping jaw against the abutment. The clamping jaw has a displaceable support element (14) and two claws (16a; 16b) located opposite one another and engaging around the tube at least in some regions. The claws are articulated on the support element by the respective rear ends thereof such as to pivot about pivot pins oriented parallel to the axial direction, whereby the mouth opens as the clamping jaw advances and closes as the clamping jaw retracts.

4 Claims, 3 Drawing Sheets

(58) Field of Classification Search
USPC .................................................. 251/4, 5, 7–9
See application file for complete search history.

(56) References Cited

U.S. PATENT DOCUMENTS

| | | | | |
|---|---|---|---|---|
| 5,297,773 | A * | 3/1994 | Collins | F16K 7/063 |
| | | | | 138/141 |
| 6,289,912 | B1 * | 9/2001 | McPeak | F16K 7/063 |
| | | | | 137/15.18 |
| 6,361,016 | B1 | 3/2002 | Schulz | |
| 6,502,367 | B1 * | 1/2003 | Sterner | B65B 51/00 |
| | | | | 53/138.3 |
| 2002/0158217 | A1 * | 10/2002 | Inoue | F16K 31/1221 |
| | | | | 251/5 |
| 2007/0051909 | A1 * | 3/2007 | Bernstein | F16K 7/065 |
| | | | | 251/9 |

FOREIGN PATENT DOCUMENTS

| | | | | |
|---|---|---|---|---|
| FR | 2756348 A1 * | 5/1998 | ............. | F16K 7/065 |
| GB | 957412 A | 5/1964 | | |
| GB | 2017253 A * | 10/1979 | ............... | F16K 7/06 |

* cited by examiner

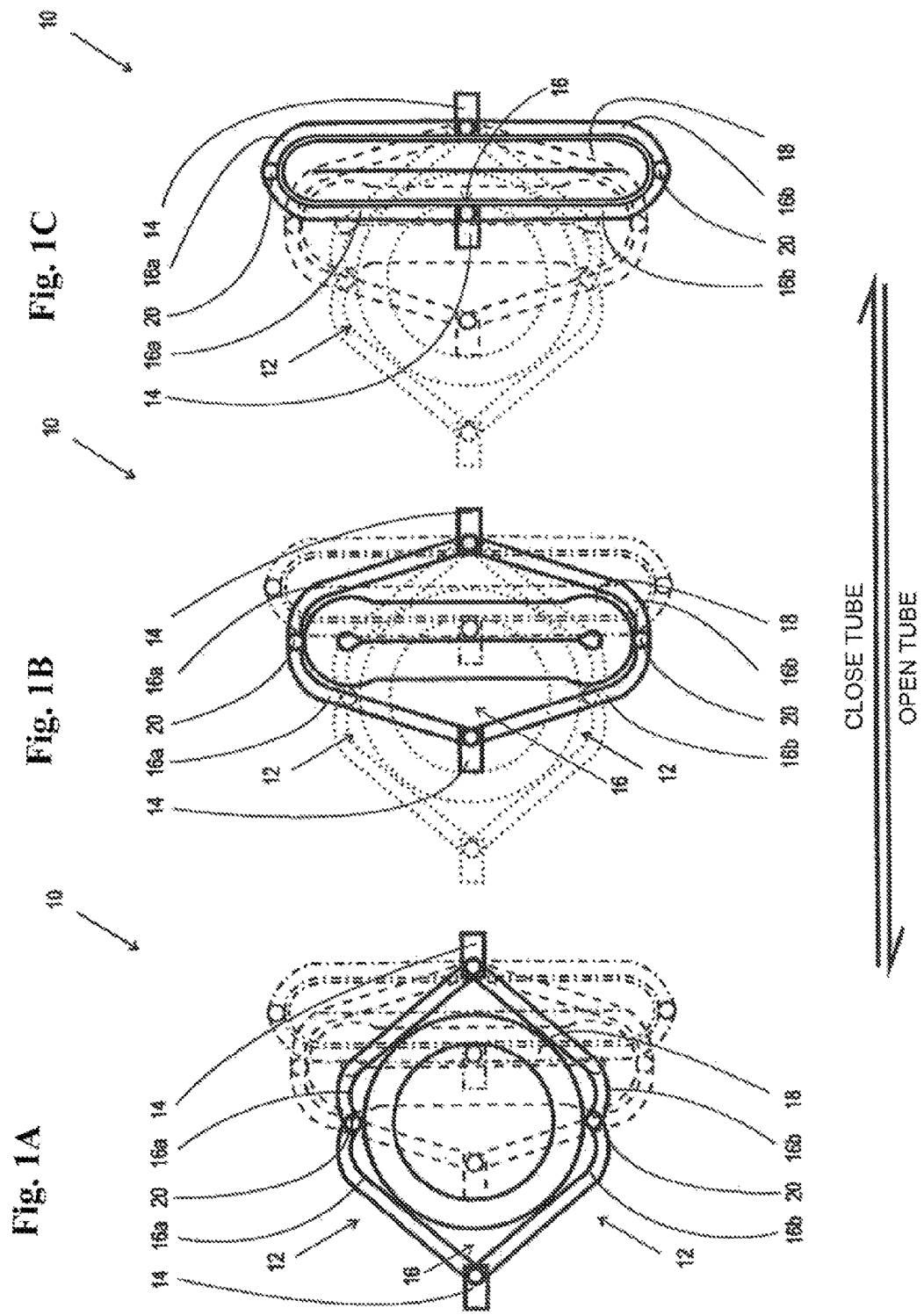

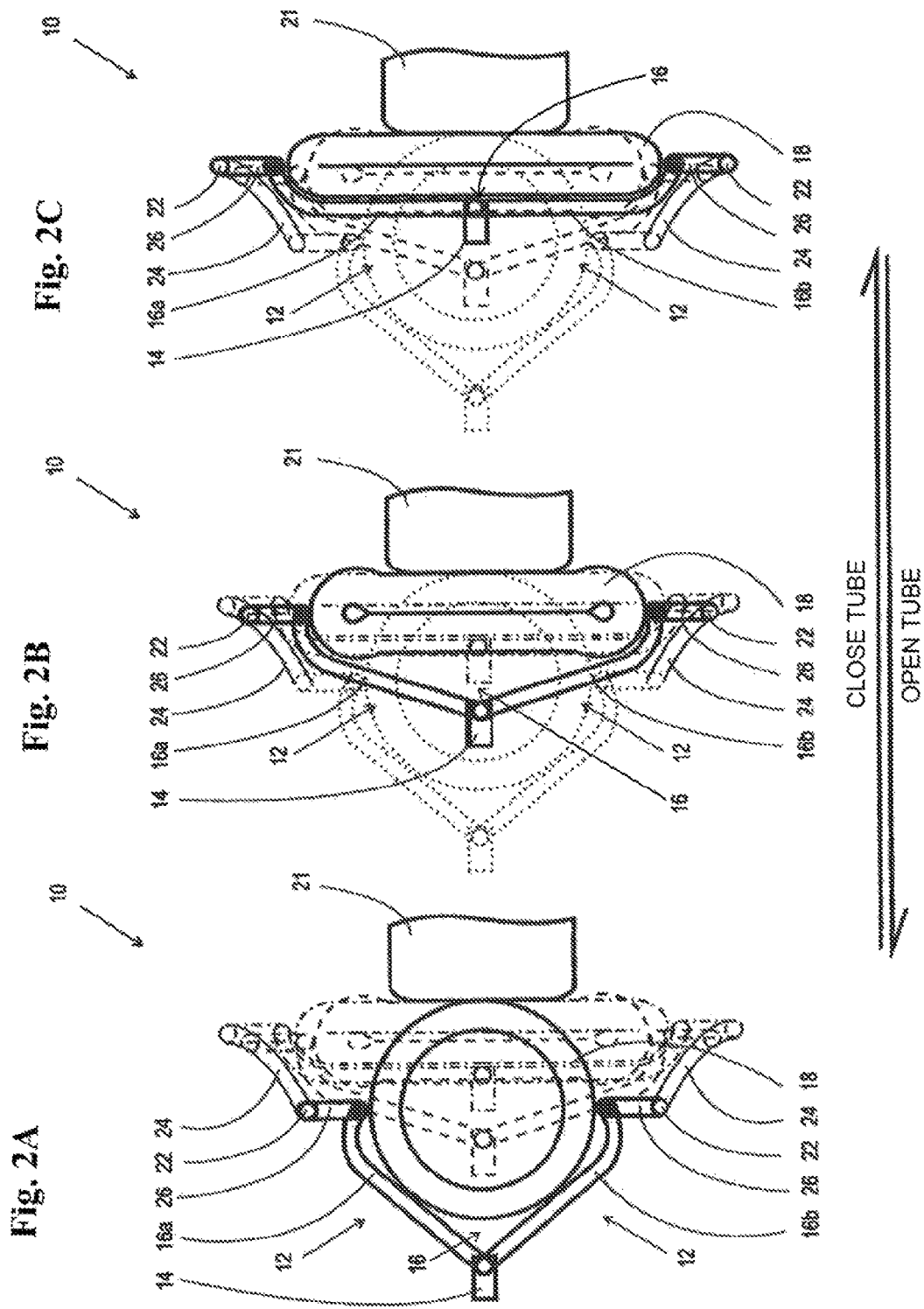

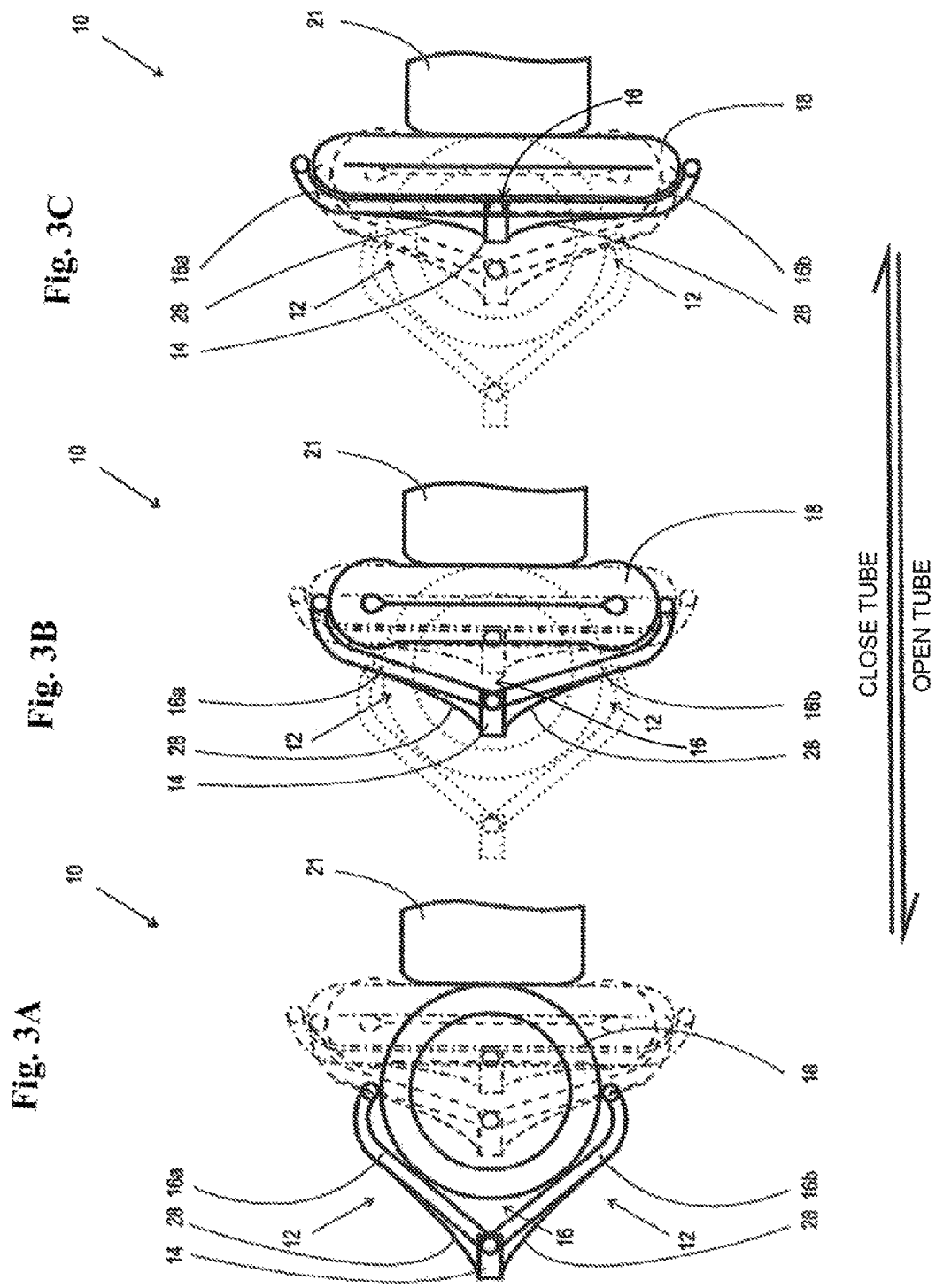

PINCH VALVE

This is a Continuation of International Application PCT/EP2012/003955, with an international filing date of Sep. 21, 2012, and the complete disclosure of which is incorporated into this application by reference.

FIELD OF AND BACKGROUND OF THE INVENTION

The invention relates to a pinch valve, comprising
an axially extending tube guide,
a clamping jaw which displaces perpendicularly to the axial direction, and
an abutment which is arranged opposing the clamping jaw in the displacement direction of the clamping jaw,
wherein the tube guide, the clamping jaw and the abutment are arranged in relation to one another such that a flexible tube laid in the tube guide is pinched against the abutment by the advance of the clamping jaw.

Pinch valves are known in many variants. For example, from DE 199 17622 C2, there is known a basic type of pinch valve. Pinch valves of this type have a tube guide into which a medium-transporting flexible tube can be laid. The tube guide serves for more or less precise positioning of the tube relative to the pinch valve and a more or less permanent fixing of both elements to one another. The orientation of the tube guide, that is, the orientation of the tube in the mounted state is herein identified as axial or the axial direction. central element of many pinch valves is a clamping jaw which is displaceable perpendicularly to the axial direction toward an abutment. The clamping jaw and the abutment are arranged on either side of the tube guide, that is, the tube guide lies between the clamping jaw and the abutment. In this way, an advance of the clamping jaw, that is, the movement thereof toward the abutment, leads to a narrowing of the free lumen of the tube guide and therefore to pinching of a flexible tube laid in the tube guide. The free lumen of the tube is thereby narrowed to the point of complete closure, so that a medium flow in the tube is reduced or entirely prevented. The force necessary for advancing the clamping jaw can be generated manually or automatically, for example, electromotively or electromagnetically.

From both WO 03/070313 A1 and U.S. Pat. No. 4,518,14 A, valves are known which use tube-shaped elastic sealing elements and operate similarly to the valve described above.

In all of the examples, in order to open the valve again, the advancing force is switched off and, in some cases, the clamping jaw is pulled back. However, if the shape restoring force of the tube is sufficient, the latter is often not necessary. In any event, the shape restoring force of the tube must be at least so great that, supported by the pressure of the medium in the tube, the force is sufficient to restore the original tube form with an open lumen. This requires relatively thick, elastic tube walls and/or a relatively high medium pressure in the interior of the tube. However, this cannot be guaranteed in all cases of use. Particularly in cases of very low medium flow as occurs, for example, in the pharmaceutical and biotechnical industries when handling small quantities of high-value fluids, a very low medium pressure prevails and the tube walls are often extremely thin so that, particularly following long pinching times, the danger exists that the tube opens incompletely or not at all. This must be considered disadvantageous because, particularly in precision processes, a very exactly reproducible medium flow through all conducting elements is required.

DE 299 13 774 U1 addresses this problem and proposes, as a solution, guiding a medium-conducting product tube symmetrically surrounded by four pressure medium-filled working tubes in a rigid pipe. The application of pressure to two mutually opposing working tubes leads to pinching of the product tube which lies therebetween and which is able to expand perpendicularly to the pinch direction, since the working tubes are not pressurized at this time point and are therefore pliable. In order to re-open the product tube, the previously pressurized working tubes are de-pressurized and the previously de-pressurized working tubes are pressurized. The product tube is thereby returned to its original form. A disadvantage of this device is the complex design which, for the pinch valve, requires at least two independent pressure medium conduits and pressure generation apparatus which must be regarded as unfavorable in terms of costs, spatial demands and susceptibility.

OBJECTS AND SUMMARY

It is an object of the present invention further to develop a pinch valve of this generic type such that, on opening of the valve, complete re-opening of the tube laid therein is assured.

This and other objects are addressed by a pinch valve in which the clamping jaw has a displaceable support element and at least two claws are arranged opposing one another and which engage at least partly around the tube guide and which, with the respective rear ends thereof, are articulated on the support element so as to be pivotable about pivot axes oriented parallel to the axial direction, in order to form a mouth which opens as the clamping jaw is advanced and which closes as the clamping jaw is retracted.

According to the invention the clamping jaw is configured in multiple parts. A support element which is displaceable in the clamping jaw displacement direction acts essentially like a conventional clamping jaw. For example, the support element can be configured plunger-shaped. However, unlike the prior art, two claws which together form a mouth which engages around the inserted tube at least in some places are articulated on the support element. The claws can be pivotable about the same pivot axis or different pivot axes offset parallel to one another. When the clamping jaw is advanced, the tube to be pinched is deformed and stretches perpendicularly to the axial direction and perpendicularly to the clamping jaw displacement direction. By this, the jaws which preferably lie closely against the tube are pivoted outwardly and the mouth formed by the claws opens. With a suitable mechanism for which various preferred embodiments are given below, the claws pivot back independently on retraction of the clamping jaw and thereby exert on the pinched tube an essentially radially inwardly directed force which has, in particular, a substantial force component perpendicular to the clamping jaw displacement direction and perpendicular to the axial direction and therefore contrary to the tube deformation brought about by the pinching. This promotes the restoration of the shape of the tube to the original state. It is thereby ensured that when the pinch valve is opened, despite small restoring forces of the tube walls and despite low internal pressure of the medium conducted through the tube, the tube is fully opened again so that the state which prevailed before closure of the pinch valve is restored.

The actual design of the mechanism which ensures the closing of the mouth on retraction of the clamping jaw can take various forms. In a preferred embodiment, it is provided that two clamping jaws are arranged on each side of the tube guide, opposing one another in the displacement direction, displaceable relative to one another and acting as respective abutments for one another, the respective front claw ends thereof being articulated on one another in pairs. In other words, two essentially identically configured clamping jaws act from two sides upon the tube to be pinched. The mouths thereof each engage half around the tube guide and around the tube laid therein. During a relative displacement of the clamping jaws toward one another, that is, during advancing, the claw ends move radially outwardly along the tube central plane, perpendicularly to the axial direction and the clamping jaw displacement direction. In the event that both clamping jaws are displaceable relative to tube guide and move mutually synchronously, the tube central plane remains locally fixed during the process. In the event that only one clamping jaw is displaceable relative to the tube guide, the tube central plane moves during the process in the direction toward the fixed clamping jaw. With opposing relative movement of the clamping jaws, that is, when the valve is opened, the articulation of the front claw ends on one another prevents movement of the claw ends out of the tube central plane. In other words, in the open state, the mouths are prevented from retracting together with the support element. Rather, an inward movement of the claw ends opposed to the outwardly directed outward movement, and thus a force acting on the tube against the deformation direction thereof is generated during closing of the valve. As explained above, restoration of the shape of the tube into the fully open state is thereby promoted.

In another preferred variant, it is provided that the respective front claw ends are articulated on guides which delimit a movement of the front claw ends in the displacement direction of the clamping jaw. This variant is preferred if only one clamping jaw supporting a mouth is provided. The guide can be, for example, firmly fixed to the rigid abutment and exactly perpendicular to the axial direction and the clamping jaw displacement direction. In this case, the claws engage significantly more than half around the tube and/or the tube guide. However, it is also possible for the guide to permit a movement component parallel to the clamping jaw displacement direction, thus forcing the claw ends onto a pre-defined curved path. The actual curve form of the guide dictates the actual force flow form on the tube and must be matched to the form and material properties thereof.

In a third variant, it is provided that the claws are spring pre-tensioned in the closing direction of the mouth formed thereby. This can be achieved in each case by, for example, a leaf spring which is supported both on the claw and on the support element. In this variant, however, the spring force must be very precisely matched to the tube properties and the medium properties. Otherwise the risk exists that the lack of restoring force in the tube is overcompensated by an excessive spring force and the tube is pinched in the other direction on opening the valve.

Naturally, in all cases, manual actuation of the clamping jaw or clamping jaws is possible. Preferably, however, a motorized or magnetic drive unit is provided with which a clamping jaw displacement can be generated. Pneumatic or hydraulic drive units are also suitable.

Further features and advantages of the invention are disclosed in the following detailed description and in the drawings.

BRIEF DESCRIPTION OF THE DRAWINGS

In the drawings:
FIGS. 1A-1C are respective schematic representations of three opening and closing positions of a first embodiment of a pinch valve according to a first embodiment of the invention,
FIGS. 2A-2C are respective schematic representations of three opening and closing positions of a second embodiment of a pinch valve according to the invention, and
FIGS. 3A-3C are respective schematic representations of three opening and closing positions of a third embodiment of a pinch valve according to the invention.

DETAILED DESCRIPTION OF EXEMPLARY EMBODIMENTS

Specific embodiments of the invention will now be described by reference to FIGS. 1 to 3 which each show a series of three opening and losing positions of a pinch value 10 according to the invention in schematic representations. The same reference signs indicate the same or similar components. The position sequence for closing the pinch valve 10 is represented in the drawings from left to right (FIG. 1A, FIG. 1B and FIG. 1C, etc.); conversely, the position sequence for opening the pinch valve 10 is represented from right to left. In each representation, the respective current opening or closing position is shown outlined with continuous bold lines; to illustrate the movement, the two other opening and closing positions are shown with broken lines, specifically dotted, dashed or dot-dashed lines.

FIG. 1 shows a first embodiment of the pinch valve 10 according to the invention. The pinch valve 10 consists of two mutually opposed, essentially identically configured clamping jaws 12. Each clamping jaw 12 comprises a support element 14 and two claws 16a, 16b articulated thereon. The claws 16a, 16b form a mouth 16 which engages half around a tube guide (not shown in detail). Thus, the claws 16a, 16b also engage around a tube 18 laid in the mouth 16, which is represented with a round cross-section in the embodiment shown. However, the principle of the present invention is not restricted to tubes with a round cross-section.

The mutually opposed clamping jaws 12 are articulated on one another with their claws 16a and 16b via articulation sites 20 which are situated in the region of the front claw ends. The support elements 14 of the two clamping jaws 12 are displaceable relative to one another in the common plane thereof, in particular toward and away from one another. In the embodiment shown, the right-hand support element 14 in the drawing is fixed, whereas the left-hand support element 14 in the drawing is linearly displaceable. Naturally, the converse arrangement is also possible, as well as an arrangement in which both support elements 14 are displaceable toward and away from one another relative to a device base (not shown).

If the left-hand support element 14 in the drawing is displaced toward the support element 14 on the right in the drawing, the encompassed tube 18 is laterally pinched, and the material thereof pinched in the horizontal direction is stretched in the vertical direction. This is made possible in that the mouths formed by the claws 16a, 16b open due to their articulated connection to one another. The two mouths form a parallelogram which is squashed by the horizontal displacement of the left-hand support element 14. A position during this horizontal movement is shown in the central representation (FIG. 1B) of FIG. 1.

A further advance of the left-hand support element 14 in the horizontal direction brings the pinch valve 10 into the right-hand position (FIG. 1C) in FIG. 1. It is evident that, in the example shown, the specific form of the claws 16a, 16b is preferably matched to the outer contour of the pinched tube 18, so that in the closed position of the pinch valve 10, the lumen of the tube 18 is securely closed.

In order to open the pinch valve 10, the left-hand support element 14 is displaced back to the left. Herein, the parallelogram formed by the claws 16a, 16b is stretched in the horizontal direction. In this way, the articulation points 20 of the two mouths move toward one another. As the central representation (FIG. 1B), in particular, clearly shows, pressure is thereby exerted on the vertical end regions of the pinched tube 18. The tube is thereby forced back into the starting form thereof, even with only small form restoring forces and/or low internal pressure in the medium conducted in the tube.

FIG. 2 shows a second embodiment of the pinch valve 10 according to the invention wherein only a single clamping jaw 12 with a complex shape is needed, the second clamping jaw being replaced by a rigid, block-like abutment 21. The clamping jaw 12 of the embodiment of FIG. 2 is essentially configured identically to the left-hand clamping jaw 12 in FIG. 1. Reference is therefore made to the description above. Unlike the embodiment of FIG. 1, however, no articulation points are provided at the claw ends, but rather in each case, a sliding block 22 is provided which is slidingly mounted on a curved rail 24. For space reasons, the sliding block 22 is offset in the vertical direction outwardly by a distancing member 26 firmly connected to the claw 16a, 16b. Collisions between the curved rail 24 and the claws 16a, 16b are thereby prevented when the mouth formed by the claws 16a, 16b is opened.

During horizontal displacement of the support element 14 toward the rigid abutment 21, due to the movement restriction which the curved rails 24 exert on the claws 16a, 16b via the sliding blocks 22, the mouth of the clamping jaw 12 is opened so that the pinched tube 18 can expand vertically. An intermediate position of the movement is shown in the central image of FIG. 2 (FIG. 2B); the final closed position is shown in the right-hand image of FIG. 2 (FIG. 2C).

On retraction of the support element 14 in the horizontal direction, the curved rail 24 and the sliding block 22 force the closing of the mouth of the clamping jaw 12, so that, as in the first exemplary embodiment, a vertical force is exerted on the pinched tube, which promotes a return to the original form.

Finally, FIG. 3 shows a third embodiment of a pinch valve 3 according to the invention which, similarly to the previously outlined second embodiment, needs only one clamping jaw 12. Reference is therefore made to the description above. Unlike the embodiment of FIG. 2, however, the force applied to the pinched tube 18 in the vertical direction during re-opening of the pinch valve 10 is not exerted through a sliding mechanism, but rather through spring forces, which act on the claws 16a, 16b via leaf springs 28. In the embodiment shown, the leaf springs 28 are supported at one side on the outside of the claws 16a, 16b and at the other side on the support element 14. On closing the pinch valve 10, the advance of the support element 14 takes place against the pre-tensioning force of the leaf springs 28.

Naturally, the embodiments described in the detailed description and illustrated in the drawings are merely illustrative exemplary embodiments of the present invention. In light of the present disclosure, a broad spectrum of variation possibilities would be apparent to a person skilled in the art.

In particular, combinations of the three exemplary embodiments shown, for example, a spring support in the exemplary embodiments of FIG. 1 or FIG. 2 or a variant with two clamping jaws 12 which are each guided with a sliding mechanism, are conceivable.

The invention claimed is:

1. A pinch valve, comprising:
   a clamping jaw configured to advance and retract in displacement directions that extend perpendicularly to a fixed axis extending in an axial direction and forming a mouth shaped to receive a flexible tube that extends in the axial direction,
   an abutment arranged in fixed relation to the fixed axis and opposing the clamping jaw in one of the displacement directions of the clamping jaw,
      wherein the clamping jaw and the abutment are arranged in mutual relation such that the clamping jaw, when fully advanced, extends laterally beyond the abutment in directions that extend perpendicularly both to the fixed axis and to the displacement directions, and such that the tube is pinched against the abutment by the advance of the clamping jaw and, when fully pinched between the abutment and the clamping jaw, also extends laterally beyond the abutment in the directions that extend perpendicularly both to the fixed axis and to the displacement directions, and
      wherein the clamping jaw comprises at least one displaceable support element and at least two claws which are arranged opposing one another, which have respective rear ends, which engage at least partly around the tube, and which, with the respective rear ends, are articulated on the displaceable support element so as to pivot about pivot axes oriented parallel to the axial direction, whereby the mouth opens as the clamping jaw advances and closes as the clamping jaw retracts, and
   a second support element and a third support element,
      wherein the second and third support elements each comprise a guide which delimits movement of a respective front end of each of the claws while the two claws are articulated in the displacement directions by the displaceable support element, and
      wherein the guides each comprise a sliding block attached respectively to each of the front ends of the claws and mounted slidingly respectively on each of two rails that are arranged in fixed relation to the fixed axis.

2. The pinch valve as claimed in claim 1, wherein: the front ends of the claws are articulated on respective guides which delimit movement of the front ends of the claws in the displacement directions of the clamping jaw.

3. The pinch valve as claimed in claim 1, wherein the second and third support elements each comprise a pretensioning spring that pretensions a respective one of the claws in the retracting direction of the clamping jaw.

4. A pinch valve, comprising:
   a clamping jaw configured to advance and retract in displacement directions that extend perpendicularly to a fixed axis extending in an axial direction and forming a mouth shaped to receive a flexible tube that extends in the axial direction,
   an abutment arranged in fixed relation to the fixed axis and opposing the clamping jaw in one of the displacement directions of the clamping jaw, wherein the clamping jaw and the abutment are arranged in mutual relation such that the tube is pinched against the abutment by the advance of the clamping jaw, and wherein the clamping jaw comprises at least one displaceable support element and at least two claws which are arranged opposing one another, which have respective rear ends, which engage at least partly around the tube, and which, with the respective rear ends, are articulated on the displaceable support element so as to pivot about pivot axes oriented parallel to the axial direction, whereby the mouth opens as the clamping jaw advances and closes as the clamping jaw retracts, and a second support element and a third support element, wherein the second and third support elements each comprise a guide which delimits movement of a respective front end of each of the claws while the two claws are articulated in the displacement directions by the displaceable support element, wherein the guides each comprise a sliding block attached respectively to each of the front ends of the claws and mounted slidingly respectively on each of two rails that are arranged in fixed relation to the fixed axis, and wherein each of the guides further comprises a respective distancing member that extends respectively between a respective one of the pivot axes and a respective one of the sliding blocks and respectively offsets the pivot axes from the two rails in directions that are perpendicular to both the axial direction and the displacement directions.

\* \* \* \* \*